United States Patent [19]
Inoue

[11] Patent Number: 5,302,972
[45] Date of Patent: Apr. 12, 1994

[54] METHOD OF SETTING DENSITY FOR IMAGE RECORDING APPARATUS

[75] Inventor: Hitoshi Inoue, Inagi, Japan

[73] Assignee: Canon Kabushiki Kaisha, Tokyo, Japan

[21] Appl. No.: 779,823

[22] Filed: Oct. 21, 1991

[30] Foreign Application Priority Data

Nov. 29, 1990 [JP] Japan .................. 2-336726

[51] Int. Cl.⁵ ............................. H04N 1/21
[52] U.S. Cl. .................................... 346/108
[58] Field of Search ............ 358/298, 296, 300, 302; 346/108, 762, 160

[56] References Cited

U.S. PATENT DOCUMENTS

| | | | |
|---|---|---|---|
| 4,232,344 | 11/1980 | Sakamoto et al. | 358/298 |
| 4,307,408 | 12/1981 | Kiyohara et al. | 346/108 |
| 4,751,377 | 6/1988 | Ishizaka et al. | 358/300 |
| 4,864,419 | 9/1989 | Saito et al. | 358/396 |
| 4,870,506 | 9/1989 | Nakauchi | 250/205 |
| 4,882,621 | 11/1989 | Suzuki et al. | 358/80 |
| 4,888,636 | 12/1989 | Abe | 358/80 |
| 4,985,779 | 1/1991 | Gall | 358/298 |
| 5,028,991 | 7/1991 | Sekizawa et al. | 358/75 |

FOREIGN PATENT DOCUMENTS

269033 11/1987 European Pat. Off. .
3408336 9/1984 Fed. Rep. of Germany .
60-250327 12/1985 Japan .

*Primary Examiner*—Mark J. Reinhart
*Attorney, Agent, or Firm*—Fitzpatrick, Cella, Harper & Scinto

[57] ABSTRACT

In a method of setting density for an image recording apparatus, an image for measurement having a plurality of regions having different densities is recorded by scanning a photosensitive material with a light beam having a constant intensity while changing light intensity using a light-amount adjusting device. The relationship between the amount of adjustment by the light-amount adjusting device and the density of the recorded image is obtained by measuring the densities of the respective regions of the recorded image for measurement. The light-amount adjusting device is set so that an image having a desired density is obtained according to the obtained relationship.

8 Claims, 4 Drawing Sheets

METHOD OF SETTING DENSITY FOR IMAGE RECORDING APPARATUS

BACKGROUND OF THE INVENTION

1. Field of the Invention

This invention relates to a method of setting a density used for an image recording apparatus, such as a laser imager for drawing an image on a photosensitive material by performing laser-beam scanning, or the like.

2. Description of the Prior Art

Recently, in the medical field, various techniques, such as CT (computed tomography), MR (magnetic resonance) and the like, have been used for observing the interior of a human body. Those techniques require high-definition images. In accordance with the development of such techniques, it has become necessary to record images obtained by these techniques without imparing the picture quality of the images. A laser imager is an apparatus which stores an image by digitizing the image for every picture element and performs recording by scanning a photosensitive member while modulating a laser beam with an intensity proportional to the digitized value of each picture element. The laser imager has an advantage in that, since the image is stored as digital values for every picture element, it is always possible to record a halftone stable image with a simple operation by performing image processing, such as gradation correction and the like. At present, a recorded image having the highest picture quality is obtained by performing recording on a transparent silver-halide film using the laser imager.

When changing the maximum density value of a photosensitive material in accordance with an object for an image, or the taste of an observer, if a method of suppressing the maximum intensity of a laser beam by directly modulating the laser beam is adopted, the dynamic range of the modulated light is reduced, particularly in the case of using a semiconductor laser light source. Hence, a desired gradation accuracy cannot be obtained. Accordingly, in general, as disclosed in Japanese Patent Application Public Disclosure (Kokai) No. 60-250327 (1985), the maximum intensity of a laser beam is optically changed by disposing a filter or the like in the optical path of the beam. For example, a polarizer is used as the filter, and the intensity of the laser beam passing through the polarizer is changed by rotating the polarizer using a dial for adjusting the density of a silver-halide film.

In the above-described conventional approach, however, the density of an image recorded on the photosensitive material is not exactly proportional to the intensity of the projected laser beam, and is greatly influenced by the environment, such as temperature and the like. Another influence is the kind of developer to be used. Hence, it is necessary to adjust the graduation of the dial for adjusting the density at a location where the laser imager is used. Conventionally, a complicated method has been adopted such that a test image is recorded and developed on a photosensitive material while the dial for adjustment is rotated to different angles, and the graduation of the dial is calibrated by measuring the densities of the recorded image. Accordingly, a method of setting the density of a photosensitive material in a simple manner is needed.

SUMMARY OF THE INVENTION

It is an object of the present invention to solve the above-described problems in the prior art.

It is another object of the present invention to provide a method which can obtain the relationship between the intensity of a laser beam and the density of an image on a photosensitive material in a simple manner, and which can easily perform density setting.

These and other objects are accomplished according to one aspect of the present invention, by a method of setting recording density in an image recording apparatus comprising the step of supplying a constant intensity light beam. The supplied constant intensity light beam is varied to provide a plurality of amounts of light. A sample image is recorded having a plurality of regions, each having different densities, by scanning a photosensitive material with the plurality of amounts of light, each of the different densities corresponds to a respective one of the plurality of amounts of light. The different densities of the sample image are measured, and a relationship is obtained between the measured different densities and the corresponding plurality of amounts of light. The light-amount adjusting means is set so that an image having a desired density is recorded according to the obtained relationship.

According to an additional aspect of the present invention, an image recording apparatus including a density setting mechanism, comprises a light generating means for generating a modulated light beam. A scanning means is provided for scanning a photosensitive material with the modulated light beam to record an image, and a density detection means detects a density of the recorded image. A light-amount adjusting means adjusts an amount of the light beam independently from the light generating means so that the recorded image has a desired density. The amount of adjustment of the light-amount adjusting means for the desired density is set in accordance with a relationship between a plurality of densities recorded on a sample image detected by the detecting means and corresponding amounts of adjustment by the light-amount adjusting means. A constant intensity light beam supplied by the light generating means is varied by the corresponding amounts of adjustment so as to scan the photosensitive material to record the plurality of densities on the sample image.

DETAILED DESCRIPTION OF THE PREFERRED EMBODIMENT

The preferred embodiment of the present invention will now be explained in detail with reference to the drawings.

Figure 1:
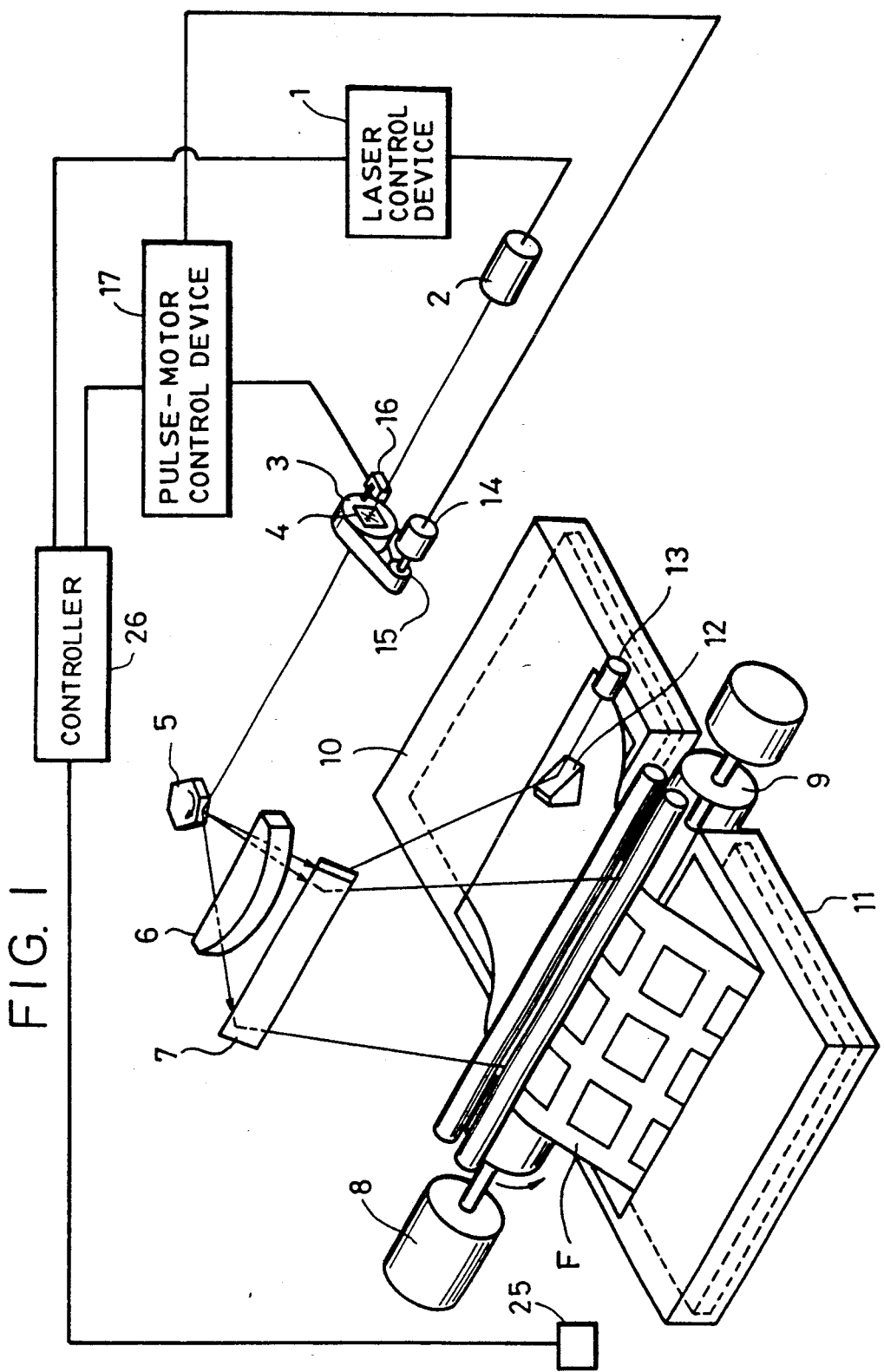
FIG. 1 is a diagram showing the configuration of a laser imager which uses a method of setting density according to an embodiment of the present invention.

FIG. 1 is a diagram showing the configuration of a laser imager which uses a method according to the present invention. In FIG. 1, on the optical path of a laser beam emitted from a semiconductor laser light source 2 connected to a laser control device 1, there is provided a cylinder 3 whose axis is arranged on the optical path of the laser beam. A polarizing beam splitter 4 is fixed on the center of the cylinder 3. A rotating polygon mirror 5, an f-θ lens 6 and a reflecting mirror 7 for performing main scanning are also disposed on the optical path. A roller 9 connected to a motor 8 is disposed in the reflecting direction of the reflecting mirror 7. A supply magazine 10 and a receiving magazine 11 for receiving a silver-halide film F are symmetrically disposed at both sides of the roller 9. In order to detect the main-scanning position of the laser beam, a mirror 12 is provided at a position where the laser beam reflected at one end portion of the reflecting mirror 7 reaches, and a photodetector 13 is provided in the direction of reflection by the mirror 12. The cylinder 3 is rotatably driven by a pulley 15 fixed on the driving shaft of a pulse motor 14. In order to detect a pin (not shown) mounted on the cylinder 3 as the initial rotational position of the cylinder 3, a photo-interrupter 16 is provided near the cylinder 3. The output of the photo-interrupter 16 is connected to a pulse-motor control device 17, whose output is connected to the pulse motor 14.

The pulse motor 14 used in the present embodiment performs, for example, one revolution when 200 pulses are input from the pulse-motor control device 17. Since the ratio of the diameter of the pulley 15 fixed on the shaft of the pulse motor 14 to the diameter of the cylinder 3 is 1 to 2, the polarizing beam splitter 4 performs one revolution with 400 pulses. The polarizing beam splitter 4 is fixed on the cylinder 3 so that the main polarizing component of the laser beam is orthogonal to the polarizing component passing through the polarizing beam splitter 4, that is, the intensity of the passing light of the laser beam has a minimum value, at the initial position where the pin mounted on the cylinder 3 passes in front of the photo-interrupter 16. When 100 pulses are received from the pulse-motor control device 17, the polarizing beam splitter 4 is rotated 90° from the initial position, and the intensity of the transmitted light of the laser beam has the maximum value.

Image information to be recorded is stored in digital values for every picture element in a storage means such as a memory device (not shown.). In the present embodiment, each picture element has 4096 tones (12 bits). The laser beam controlled and modulated in proportion to the stored picture-element value by the laser control device 1 is emitted from the semiconductor laser light source 2, advances on the optical path, and is made to be a substantially parallel light beam by a collimating lens (not shown). After passing through the polarizing beam splitter 4 fixed on the cylinder 3, the light beam performs main scanning by means of the rotating polygon mirror 5, and is reflected by the reflecting mirror 7 after passing through the f-θ lens 6. The undeveloped silver-halide film F taken out from the supply magazine 10 by a drawing means (not shown) is fed by the roller 9 driven by the motor 8 in the reflected direction of the light beam, and performs subscanning by means of the rotation of the roller 9, whereby an image is recorded on the silver-halide film F. In the medical field, a multi-format image recording as shown in FIG. 1 is generally utilized. The exposed silver-halide film F is received within the receiving magazine 11 provided at the side opposite to the supply magazine 10. The laser beam reflected by an end portion of the reflecting mirror 7 reaches the mirror 12, and is incident upon the photodetector 13 after being reflected by the mirror 12 in order to be utilized for synchronizing the main scanning.

When the maximum density value of the image changes, for example, in accordance with the object to be recorded, pulses are issued from the pulse-motor control device 17 to rotatably drive the pulse motor 14, whereby the cylinder 3 and the polarizing beam splitter 4 are rotated via the pulley 15. It is thereby possible to optically change the intensity of the laser beam transmitted through the polarizing beam splitter 4, and, as a result, to change the maximum density value of the image after development. Since the corresponding relationship between the maximum density value of the image and the rotational angle of the polarizing beam splitter 4 is in general not proportional, a result obtained by performing the following measurement is utilized.

Figure 2:
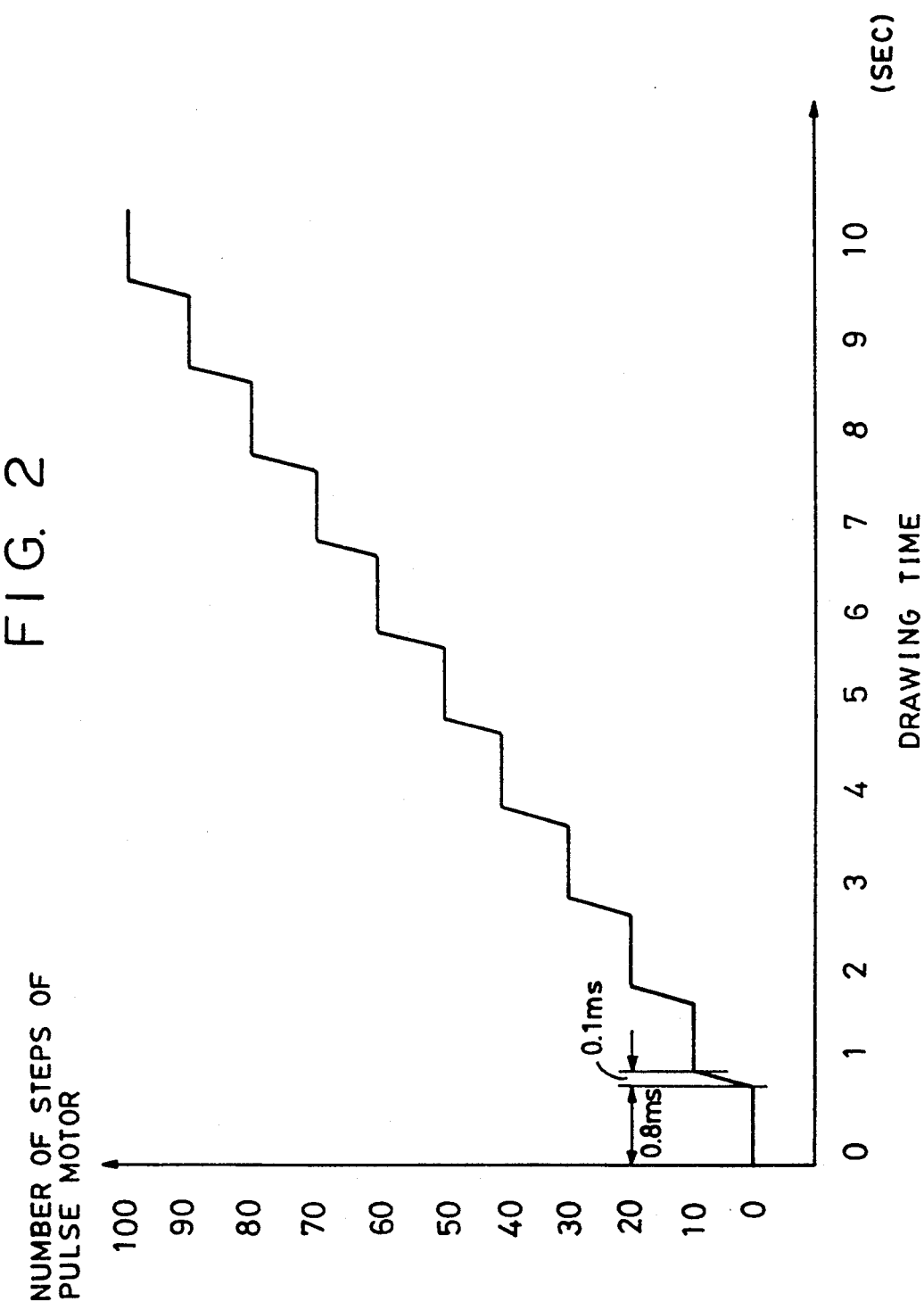
FIG. 2 is a graph illustrating the number of steps of a pulse motor in density measurement.
Figure 3:
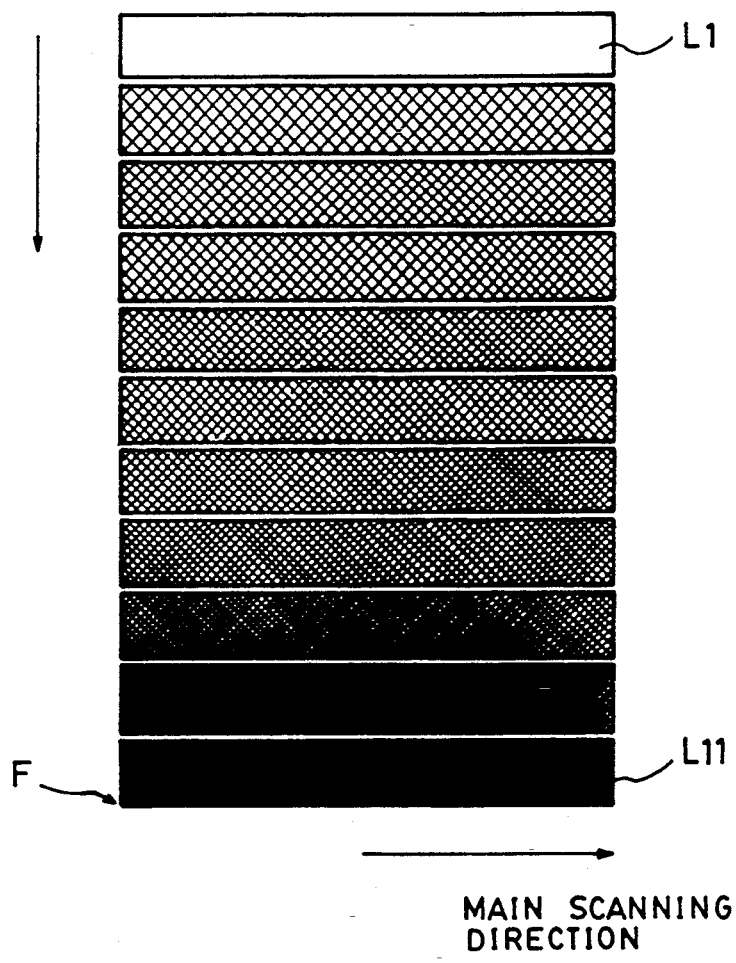
FIG. 3 is a diagram illustrating image densities on a silver-halide film.
Figure 4:
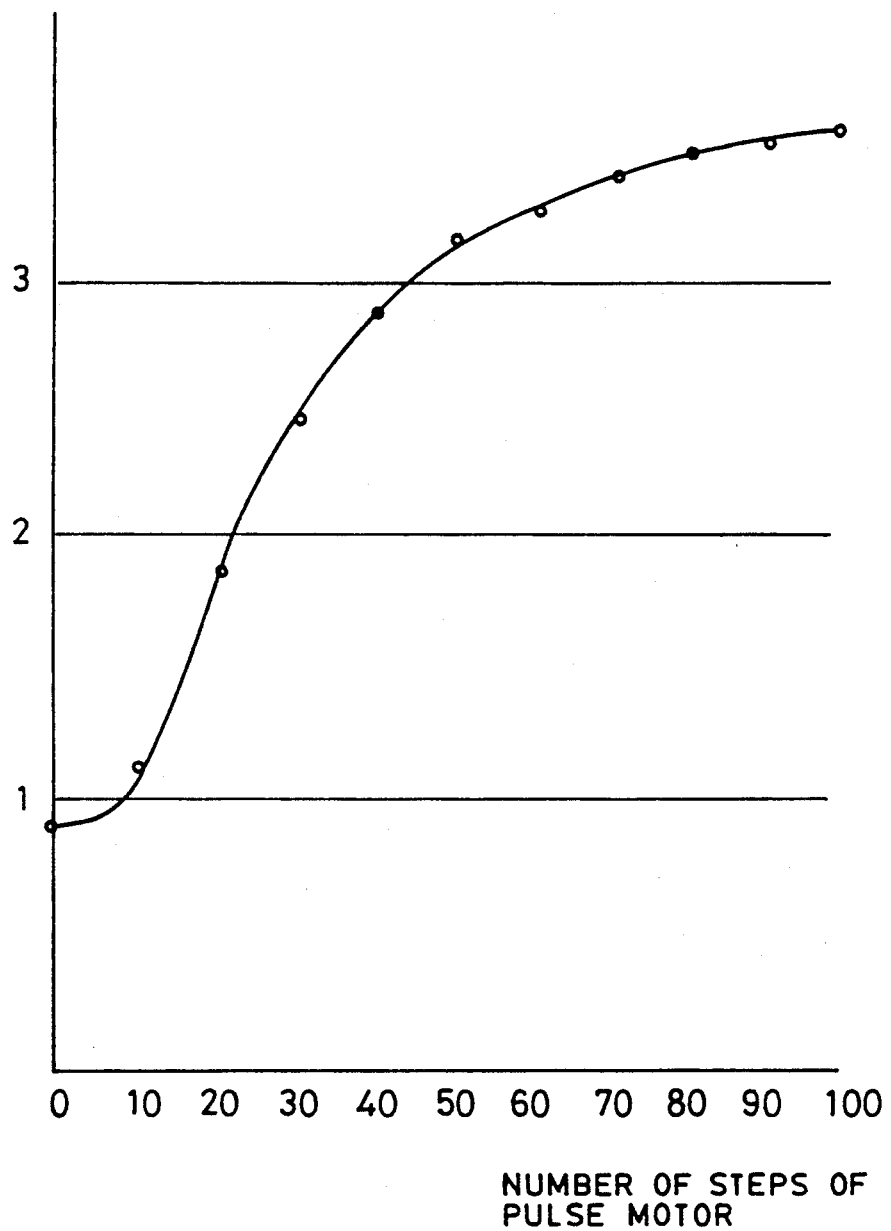
FIG. 4 is a graph illustrating the relationship between the number of steps of a pulse motor and image density.

The silver-halide film F used in the present embodiment comprises, for example, a half-cut negative film having a size of about 35 mm×43 mm. In such a film, about 10 seconds are needed for drawing one image. Accordingly, with setting the intensity of the laser beam emitted from the semiconductor laser light source 2 to the maximum value, pulses having 10 stages as shown in FIG. 2 are input from the pulse-motor control device 17 to the pulse motor 14 during 10 seconds needed for recording one image. That is, by repeating the operation of performing recording without inputting a pulse for 0.8 msec, and inputting a pulse for 0.2 msec at respective 10 stages, the polarizing beam splitter 4 is rotated from the initial position to 90° with an angular pitch of 9°, whereby the intensity of the laser beam transmitted through the polarizing beam splitter 4 is changed. As shown in FIG. 3, when using a negative film as in the present embodiment, an image for measurement having a gray scale whose density changes in 11 stages from portion L1 having the lowest density to portion L11 having the highest density is obtained after development. By measuring the densities at intermediate positions of main scanning lines and sub-scanning lines in respective density stages of this image for measurement using a densitometer, measured values of 11 points are obtained. By interpolating between the obtained measured values, the relationship between the number of steps of the pulse motor 14 and image density as shown in FIG. 4 is easily obtained. This relationship can be used in actual image recording.

The amount of light transmitted through the polarizing beam splitter 4 is substantially proportional to the square of the sine function of the rotational angle of the polarizing beam splitter 4. To the contrary, the relationship between the number of steps of the pulse motor 14 and the maximum density value of the image is not so simple, but also depends on the specifications of the laser imager being used and variations between laser imagers. According to the above-described method, however, it is possible to easily obtain the above-described relationship irrespective of the specifications of the laser beam being used and variations between laser imagers. If there is a change in the kind of the film to be used, the environment, the characteristics of the developing unit, or the like, it is possible to easily remeasure the characteristics with a simple operation.

In order to interpolate between measured values, there is, for example, a method of interpolating between measured values by calculating in controller 26 a regression curve based on the least square error discipline taking into consideration errors in measured values. The curve shown in FIG. 4 is obtained using this method. Various other methods may also be used. Although not clearly indicated, actually in the present embodiment, measured density values are stored in a storage means which is included in controller 26 of the laser imager using a certain input means, and interpolation between measured values is performed in accordance with a program stored in controller 26, which can be, for example, a microcomputer.

Although, in the present embodiment, main scanning and sub-scanning are continued also when pulses are input, no problems will arise in measuring characteristics provided that the density of a portion recorded when a pulse has been input is not used in measuring the density of the silver-halide film F. Alternatively, sub-scanning, that is, the feeding of the silver-halide film F, may be stopped when pulses are input.

The same effect of changing densities may be obtained even if a polarizing filter comprising a polarizer, or an ND (neutral density) filter having gradation is used and moved in place of the polarizing beam splitter 4.

In the above-described method of setting density, a laser beam having a constant intensity scans a photosensitive material while changing light intensity by a light-amount adjusting means, an image on the photosensitive material is developed, and the density of the image is measured, whereby the relationship between the amount of adjustment by the light-amount adjusting means, and the density of the image on the photosensitive material is obtained. By utilizing the obtained relationship, it is possible to freely set a desired density on the photosensitive material. Furthermore, since the method is executed with a simple operation, remeasurement can be easily performed.

What is claimed is:

1. A method of setting recording density in an image recording apparatus, the method comprising the steps of:

supplying a constant intensity light beam;
   varying the supplied constant intensity light beam to provide a plurality of amounts of light;
   recording a sample image having a plurality of regions, each having different densities, by scanning a photosensitive material with the plurality of amounts of light, each of the different densities corresponding to a respective one of the plurality of amounts of light;
   measuring the different densities of the sample image;
   obtaining a relationship between the measured different densities and the corresponding plurality of amounts of light; and
   setting light-amount adjusting means so that an image having a desired density is recorded according to the obtained relationship.

2. A method according to claim 1, further comprising the step of performing image recording by generating a modulated light beam according to image information after said setting step.

3. A method according to claim 1, wherein the constant intensity light beam is varied by rotating a polarizing member disposed in an optical path of the light beam.

4. A method according to claim 3, wherein the polarizing member comprises a polarizing beam splitter.

5. A method according to claim 3, wherein the polarizing member comprises a polarizing filter.

6. A method according to claim 1, wherein the constant intensity light beam is varied by moving a neutral density filter having gradation disposed in the optical path of the light beam.

7. A method according to claim 1, wherein the light beam comprises a laser beam.

8. A method according to claim 1, wherein the photosensitive material comprises a film.

* * * * *